(12) United States Patent
Ochiai et al.

(10) Patent No.: US 6,746,173 B2
(45) Date of Patent: Jun. 8, 2004

(54) UNIVERSAL JOINT

(75) Inventors: Masashi Ochiai, Gunma (JP); Seiji Kojima, Gunma (JP); Kiyoshi Hasegawa, Osaka (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/244,331

(22) Filed: Sep. 16, 2002

(65) Prior Publication Data

US 2003/0011147 A1 Jan. 16, 2003

Related U.S. Application Data

(62) Division of application No. 09/842,583, filed on Apr. 25, 2001.

(51) Int. Cl.[7] .................................................. F16D 1/12
(52) U.S. Cl. ........................ 403/137; 403/133; 403/135
(58) Field of Search ........................... 403/122, 90, 133, 403/147, 148, 137, 135

(56) References Cited

U.S. PATENT DOCUMENTS

| | | | | | |
|---|---|---|---|---|---|
| 1,976,983 | A | * | 10/1934 | Chandler | 403/137 |
| 3,182,329 | A | * | 5/1965 | Biesecker | 403/148 X |
| 4,447,139 | A | * | 5/1984 | Biber | 403/90 X |
| 5,839,845 | A | * | 11/1998 | Kincaid et al. | 403/137 X |
| 5,997,208 | A | * | 12/1999 | Urbach et al. | 403/137 X |
| 6,361,238 | B1 | * | 3/2002 | Schittl et al. | 403/142 X |

FOREIGN PATENT DOCUMENTS

| | | | |
|---|---|---|---|
| JP | 39130/94 | * | 5/1994 |
| JP | 3010021 | | 1/1995 |

* cited by examiner

Primary Examiner—John R. Cottingham
(74) Attorney, Agent, or Firm—Patterson, Thuente, Skaar & Christensen, P.A.

(57) ABSTRACT

A universal joint comprises a cavity formed in a joint case, a planar plate fitted in the cavity, a spherical member arranged in the cavity so that it is held by a spherical surface receiving seat and a portion of the planar plate, and pressure screw for pressing the planar plate toward the spherical surface receiving seat.

3 Claims, 7 Drawing Sheets

UNIVERSAL JOINT

This application is a division of application Ser. No. 09/842,583, filed Apr. 25, 2001.

BACKGROUND OF THE INVENTION

1. Field of the Invention

This present invention relates generally to a universal joint and particularly for use with an agitator and a fixing device thereof, and more particularly to an agitator having a chuck and a chuck cover, and to a fixing device for a universal clamp for fixing an agitator or the like to a supporting post at an arbitrary angle.

2. Description of the Prior Art

A conventional agitator disclosed in the Japanese Utility Model Registration No. 3010021, for example, comprises a main body of an agitator, rotary shaft, a chuck for connecting said rotary shaft with an agitating rod, and a chuck cover, wherein the chuck is covered with the chuck cover so as to prevent the hair of an operator or the like from being caught by the chuck when the chuck is rotated.

According to the conventional agitator having the chuck cover, there is no such a problem that the hair of the operator is caught by the chuck when the chuck is rotated. However, such problem cannot be solved when the chuck is not closed with the chuck cover perfectly and any device for stopping the agitator when the chuck is not closed with the chuck cover perfectly is not provided.

Further, a universal clamp for fixing physical and chemical appliances or the like to a supporting post is disclosed in the Japanese Utility Model Publication Laid-Open No. 39130/94. Such universal clamp comprises a main body, a supporting post for supporting the physical and chemical appliances, a spherical member provided on the tip end of the supporting post, a pair of holding elements for forming a spherical member supporting portion of a diameter identical substantially with or smaller than that of the spherical member, a wedge member arranged at one side of said spherical member supporting portion movably in the vertical direction, and a threaded member provided at an upper portion of said main body in order to urge said wedge member downwards to move one of said pair of holding elements toward the other of said pair of holding elements.

According to the conventional universal clamp, one of the holding elements is moved horizontally toward the other of holding elements by a horizontal component of force generated when the threaded member is rotated and thus the wedge member is moved downwards. As a result, there is such a problem that a force for holding the spherical member is small and that a large holding power cannot be obtained.

SUMMARY OF THE INVENTION

An object of the present invention is to provide a universal joint comprising a joint case to be mounted on a supporting post a cavity formed in the joint case, an elongated groove formed at the upper portion of the cavity, a planar plate fitted in the elongated groove, a spherical surface receiving seat for closing the cavity, a spherical member arranged in the cavity so that it is held by the seat and a portion of the planar plate deviated from the center of one surface of the planar plate toward the other side of the joint case, a ball shank, one end of which is connected to the spherical member and the other end of which is extended to the outside of the joint case and pressure means for pressing the other end of the planar plate toward the spherical surface receiving seat.

Another object of the present invention is to provide the universal joint, wherein the pressure means is a screw to be threaded in the joint case, one end of which is brought into contact with the other end on the other surface of the planar plate.

The other object of the present invention is to provide the universal joint, wherein the spherical surface receiving seat is threaded detachably in the joint case.

These and other objects and features of the present invention will become apparent from the following description in conjunction with the attached drawings.

DESCRIPTION OF THE PREFERRED EMBODIMENTS

Figure 1:
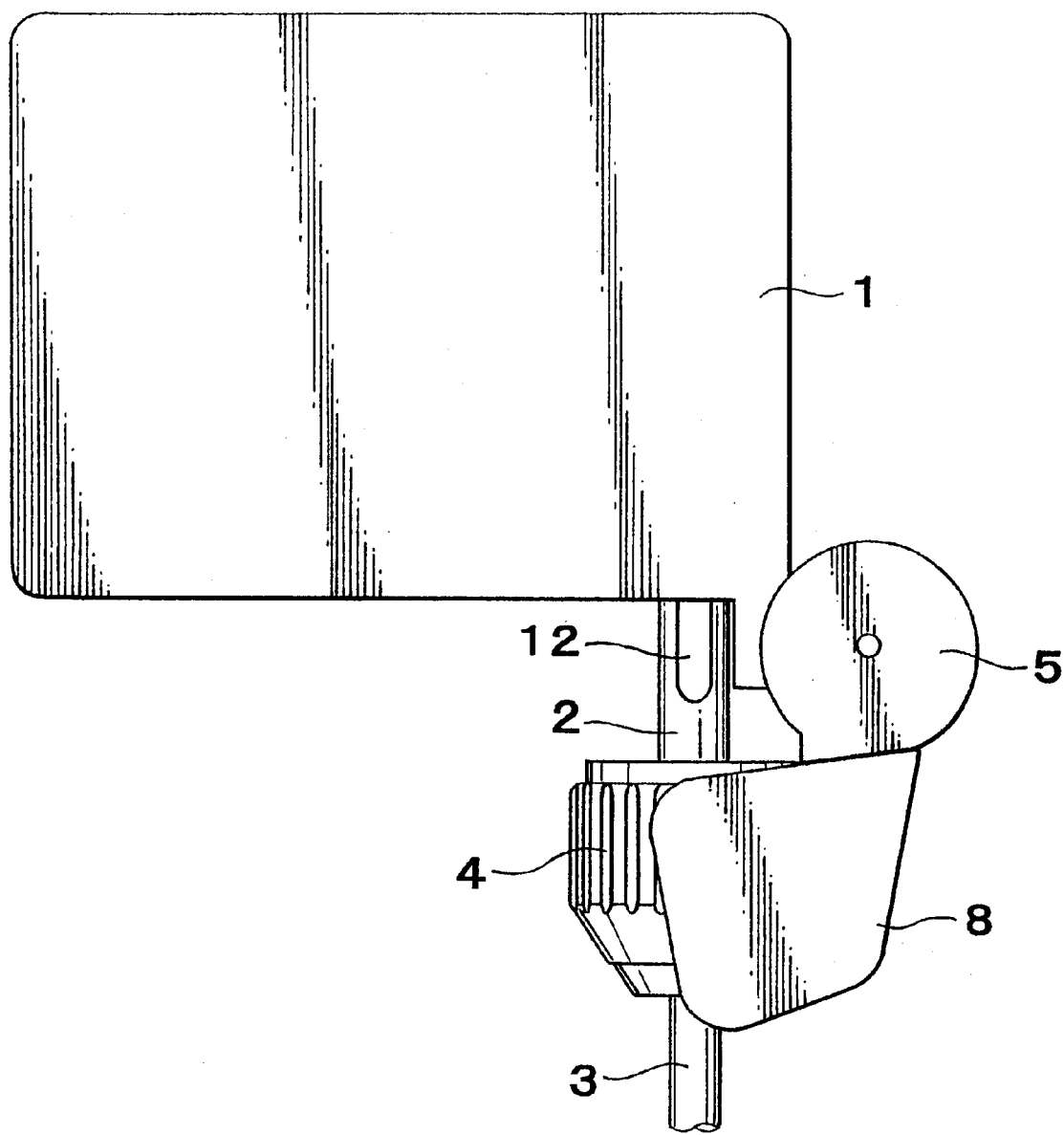
FIG. 1 is a front view of an agitator with a chuck cover according to the present invention in a state that the chuck is covered with the chuck cover.
Figure 2:
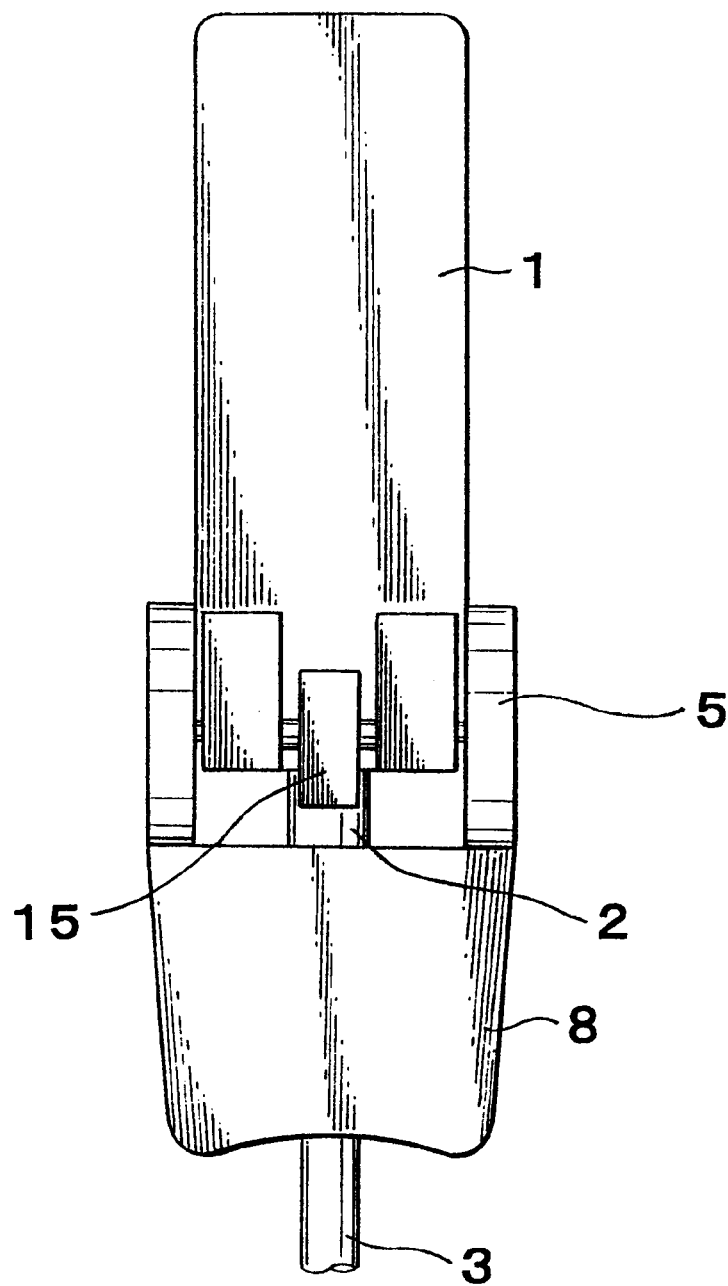
FIG. 2 is a side view of the agitator shown in FIG. 1.
Figure 3:
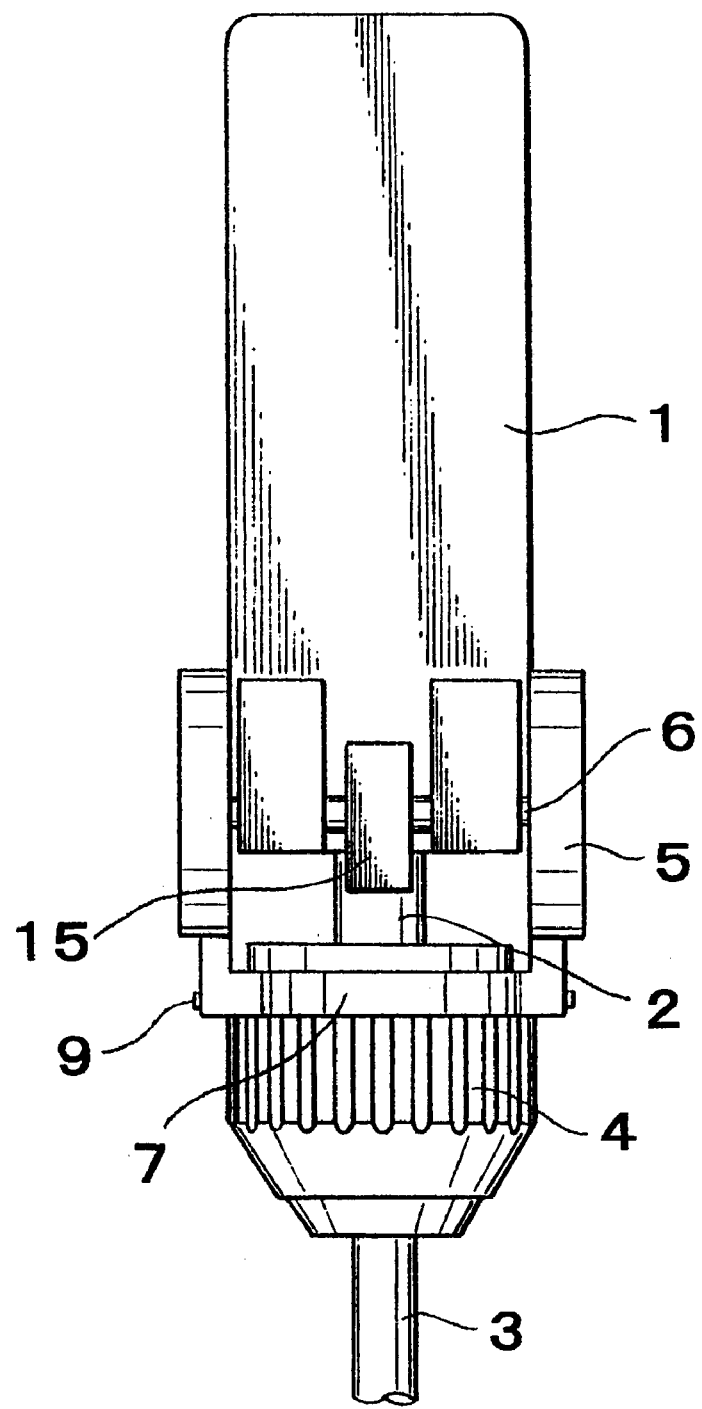
FIG. 3 is a side view of the agitator shown in FIG. 2 without the chuck cover.
Figure 4:
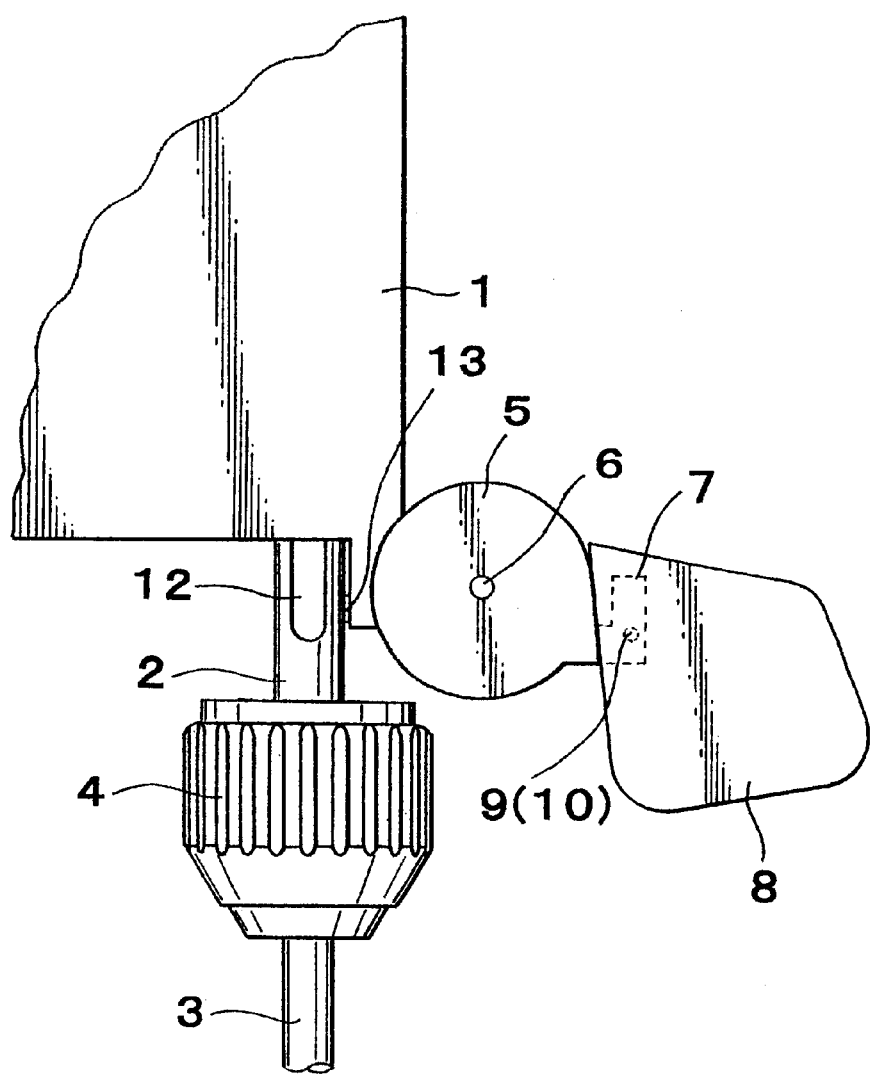
FIG. 4 is a front view of an agitator with a chuck cover according to the present invention in a state that the chuck is not covered with the chuck cover.
Figure 5:
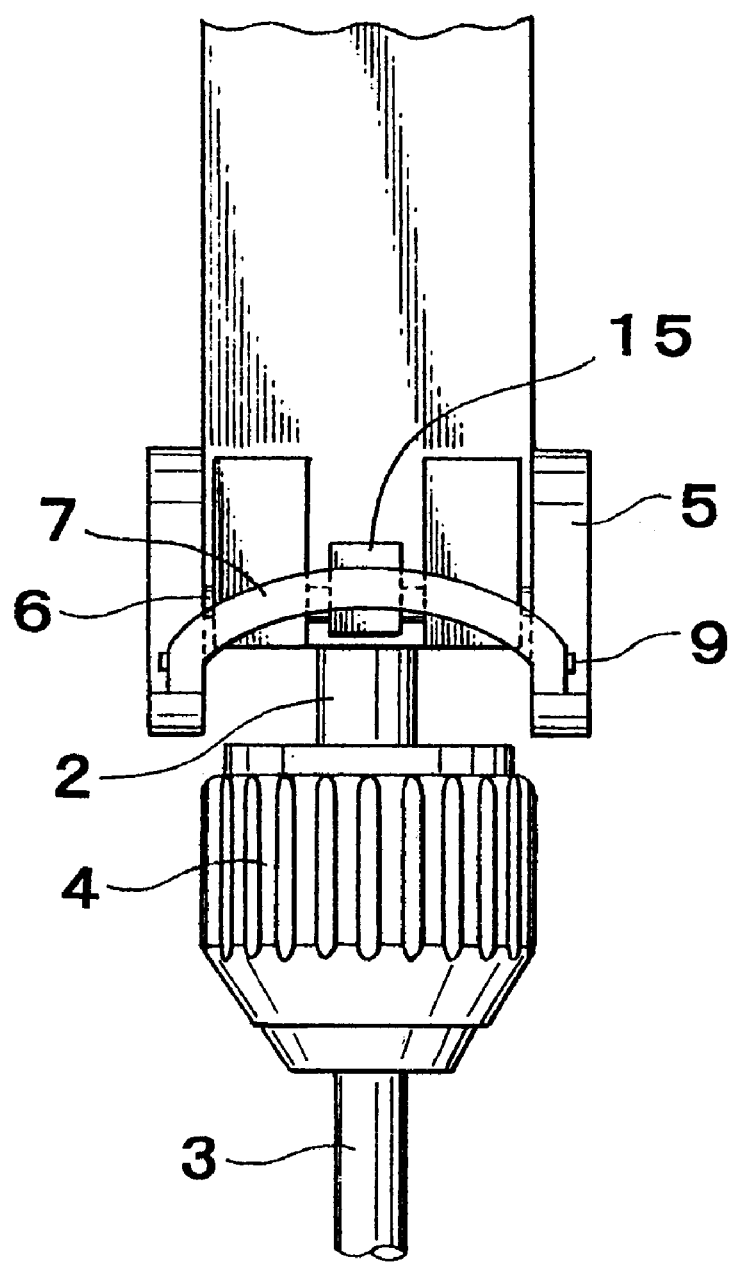
FIG. 5 is a side view of the agitator shown in FIG. 4 without the chuck cover.

An embodiment of an agitator according to the present invention will now be explained with reference to the drawings.

FIG. 1 to FIG. 5 show an agitator of the present invention. Reference numeral 1 denotes a main body of the agitator, 2 denotes a rotary shaft supported rotatably by the main body 1 and driven though reduction gears by a prime mover, such as an electric motor, 3 denotes an agitating rod, 4 denotes a conventional chuck for connecting detachably said agitating rod 3 with said rotary shaft 2, 5 denotes two disk hubs supported rotatably by the main body 1 through a pivotal pin 6, 7 denotes an arcuate connecting bar for connecting outer peripheral portions of said two disk hubs 5, and 8 denotes a curved chuck cover connected to the connecting bar 7 rotatably, the chuck cover 8 being able to move between a position where the chuck 4 is covered with the chuck cover 8 and a position where the chuck 4 is not covered with the chuck cover 8.

According to the present invention, projections or holes 9 are formed at both ends of said connoting bar 7, and holes or projections 10 corresponding to the projections or holes 9, respectively, are formed at an upper inside surface of said chuck cover 8, so that said chuck cover 8 can be connected to said disk hubs 5 through said connecting bar 7 when said projections or holes 9 is brought into engagement with the holes or projections 10, respectively, and that the chuck cove 8 can be removed easily from the connecting bar 7 when an excess force is applied to said chuck cover 8 to prevent the chuck cover 8 and the disk hubs 8 from being damaged.

Figure 6:
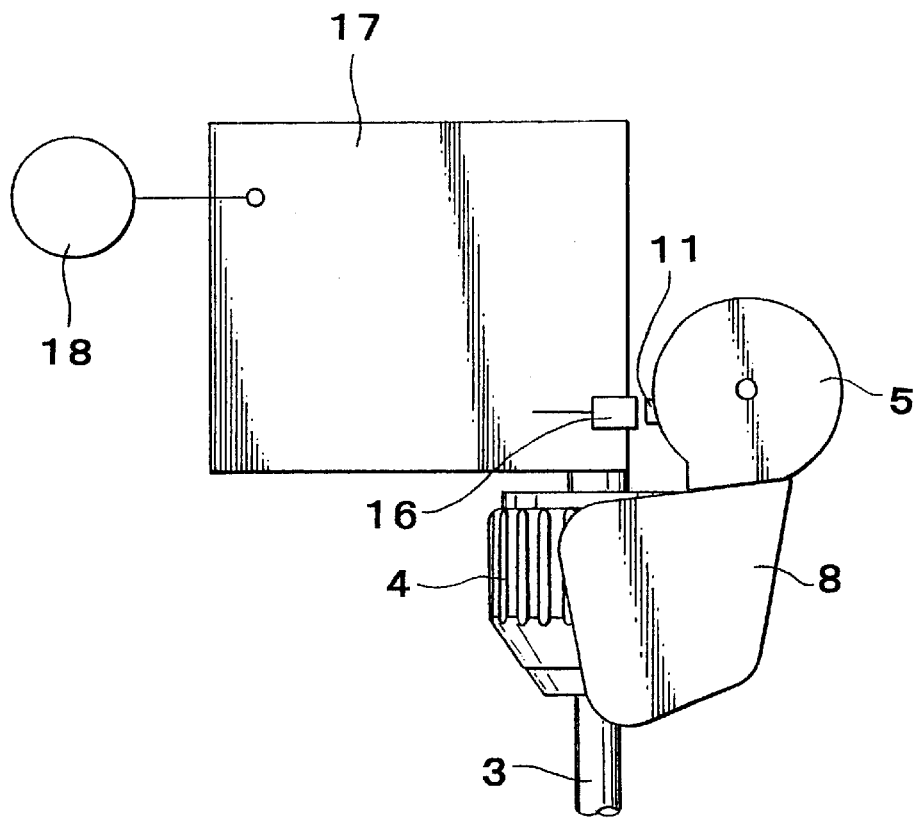
FIG. 6 is an explanation view of a stating device of the agitator according to the present invention.

Further, in the present invention, a permanent magnet 11 is provided on one portion of the outer periphery of the disk hub 5 and a magnetic sensor 16 is provided on a control circuit board 17 fixed to the main body 1 in the vicinity of the outer periphery of the disk hub 5 on which the permanent magnet 11 is provided, as shown in FIG. 6, so that an output in generated from the magnetic sensor 11 to start a motor 18 through a control circuit (not shown) only when the chuck cover 8 is moved to cover the chuck 4.

Figure 7:
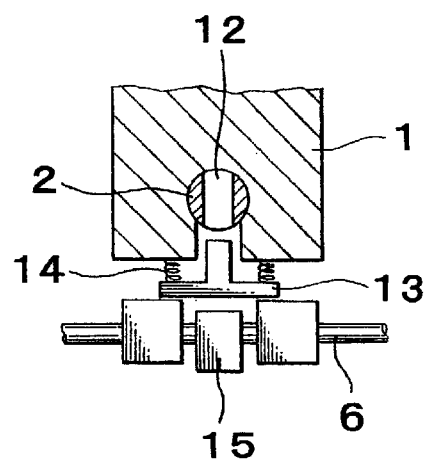
FIG. 7 is a plan view of a lock of the agitator according to the present invention.

In the present invention, furthermore, as shown in FIG. 7, an elongated hole 12 extending in the axial direction of the rotary shaft 2 is formed in the rotary shaft 2, and a lock pin 13 is provided so as to move against the force of a spring 14 in a direction normal to the axial direction of the rotary shaft 2. The lock pin 13 is urged toward the rotary shaft 2 by an eccentric cam 15 fixed to the pivotal pin 6 when the chuck cover 8 is moved to a position where the chuck cover 8 does not cover the chuck 4.

According to the agitator having the above construction of the present invention, the motor can be rotated in the state that the chuck 4 is covered with the chuck cover 8 fully, but the motor cannot be rotated if the chuck cover 8 is moved slightly from the chuck 4, because the excitation of the magnetic sensor 16 by the magnetic flux of the permanent magnet 11 mounted on the chuck cover 8 is ceased. When the chuck 4 is not covered with the chuck cover 8 fully, the lock pin 13 is urged toward the rotary shaft 2 due to the rotation of the eccentric cam 15 provided on the pivot pin 6, so that the lock pin 13 is entered into the elongated hole 12 of the rotary shaft 2 and the rotation of the rotary shaft 2 is prevented.

According to the agitator of the present invention, as stated above, such a safety gear that the motor is not started to rotation if the chuck 4 is not covered perfectly with the chuck cover 8. In other words, if the chuck cover 8 is moved slightly from the chuck 4 during the operation of the agitator the motor is stopped. When the chuck cover 8 is moved and the chuck 4 is not covered perfectly with the chuck cover 8, the lock pin 13 is inserted into the elongated hole 12 of the rotary shaft 2 and the chuck 4 cannot be rotated.

Accordingly, it is not necessary to hold by hand the rotary shaft 2 when the agitating rod 3 is replaced, and the chuck 4 can be fastened by one hand.

Figure 8:
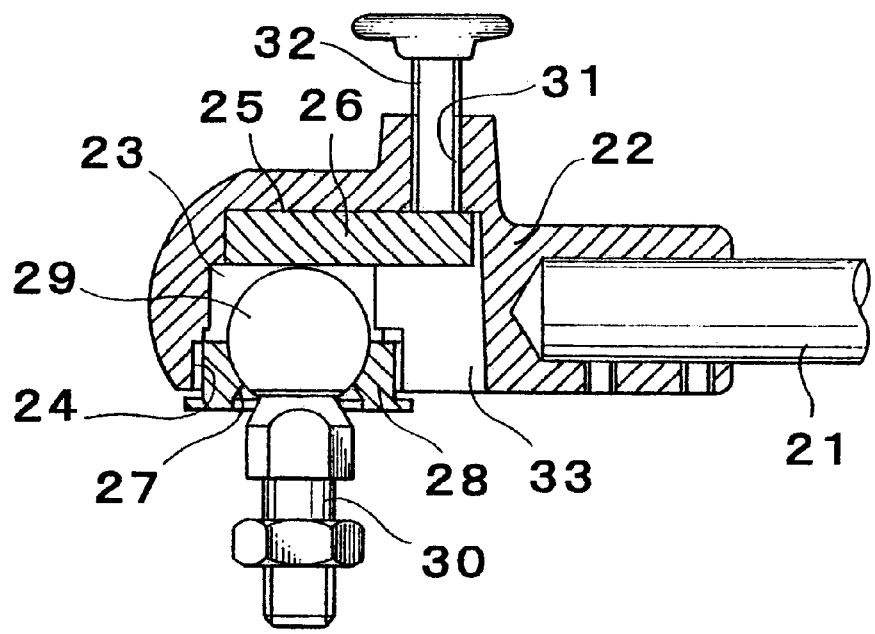
FIG. 8 is a vertically sectional side view of a universal joint according to the present invention.
Figure 9:
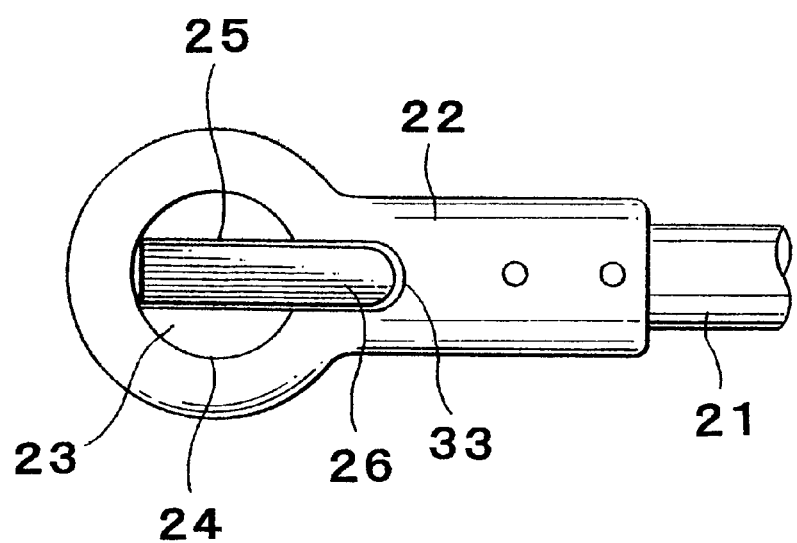
FIG. 9 is a bottom view of a joint case with a planar plate of a universal joint according to the present invention.

A universal joint of the present invention comprises, as shown in FIG. 8 and FIG. 9, a supporting post 21 extending vertically, a metal joint case 22, one end of which is fixed to the supporting post 21, a cavity 23 formed at the other end of the joint case 22, a threaded opening 24 formed at a bottom portion of the cavity 23, an elongated groove 25 of a desired depth and length formed at the upper portion of the cavity 23, a planar plate 26 of a figure similar in dimension to the figure of the elongated groove 25, to be fitted in the elongated groove 25, a disk like spherical surface receiving seat 28 threaded into the opening 24, a through hole 27 formed at the center of the seat 28, a spherical member 29 arranged in the cavity 23 so that it is held by the seat 28 and a portion of the planar plate 26 deviated from the center of the lower surface of the planar plate 26 toward the other side of the joint case 22, a ball shank 30, one end of which is connected to the spherical member 29 and the other end of which is extended to the outside of the joint case 22 passing through the through hole 27, a threaded hole 31 formed in the joint case 22 so as to communicate with one end of the elongated groove 25, and a screw 32 to be threaded into the threaded hole 31.

Reference numeral 33 denotes an elongated cutout provided in the joint case in connection with the opening 24 so that the planar plate 26 can be inserted into the elongated groove 25.

Accordingly to the universal joint of the present invention, as stated above, the spherical member 29 inserted into a space formed between the spherical surface receiving seat 28 and the lower surface of the planar plate 26 can be rotated freely in the joint case 22, so that the ball shank 30 can be arranged in an arbitrary direction with respect to the joint case 22 in a state that the screw 32 is loosened in the threaded hole 31. The planar plate 26 is inclined centering around the other end of the elongated groove 25 and the portion of the planar plate 26 deviated from the center of the lower surface of the planar plate 26 toward the other side of the joint case 22 urges strongly the top portion of the spherical member 29 downwards by the principle of the leverage, so that the spherical member 29 can be held stationarily with a pressure between the spherical surface receiving seat 28 and the planar plate 26, when the screw 32 is screwed to urge the one end of the planar plate 26.

It is desirable that the planar plate 26 and the spherical member 29 which are contacted with a large pressure with each other are made of steel and quench hardened so as to withstand the deformation and the abrasion thereof, and that the spherical surface receiving seat 28 is made of a stainless steel.

As stated above, according to the universal joint of the present invention, the joint case and the spherical surface receiving seat can be connected strongly with each other by a small force generated by the rotation of the screw, because the top portion of the spherical member is urged by the force larger than the thrust force of the screw due to the principle of the leverage, and the spherical member is urged to the entire inner peripheral surface of the spherical surface receiving seat.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A universal joint comprising a joint case, a cavity formed in the joint case, an elongated groove formed at the upper portion of the cavity, an elongated planar plate having a first end deviated a first distance from the center of the planar plate and a second end deviated a second distance from the center of the planar plate, the elongated planar plate being fitted in the elongated groove, a spherical surface receiving seat for closing the lower portion of the cavity, a spherical member arranged in the cavity so that it is held by the seat and the first end of the planar plate, a ball shank, one end which is connected to the spherical member and the other end of which is extended to the outside of the joint case, and pressure means for pressing the second end of the planar plate toward the spherical surface receiving seat.

2. The universal joint according to claim 1 wherein the pressure means is a screw to be threaded in the joint case, one end of which is brought into contact with the second end portion on the planar plate.

3. The universal joint according to claim 1 wherein the spherical surface receiving seat is threaded detachably on the lower portion of the joint case.

* * * * *

UNITED STATES PATENT AND TRADEMARK OFFICE
CERTIFICATE OF CORRECTION

PATENT NO. : 6,746,173 B2
DATED : June 8, 2004
INVENTOR(S) : Masashi Ochiai, Seiji Kojima and Kiyoshi Hasegawa It is certified that error appears in the above-identified patent and that said Letters Patent is hereby corrected as shown below:

<u>Title page,</u>
Item [73], Assignee, please insert -- As One Corporation, Osaka (JP) --

Signed and Sealed this

Nineteenth Day of July, 2005

JON W. DUDAS
*Director of the United States Patent and Trademark Office*